United States Patent
Ghazal

(10) Patent No.: US 7,321,891 B1
(45) Date of Patent: *Jan. 22, 2008

(54) PROCESSING DATABASE QUERIES

(75) Inventor: Ahmad Said Ghazal, Redono Beach, CA (US)

(73) Assignee: NCR Corp., Dayton, OH (US)

( * ) Notice: Subject to any disclaimer, the term of this patent is extended or adjusted under 35 U.S.C. 154(b) by 354 days.

This patent is subject to a terminal disclaimer.

(21) Appl. No.: 10/782,422

(22) Filed: Feb. 19, 2004

(51) Int. Cl.
*G06F 17/30* (2006.01)

(52) U.S. Cl. .................. 707/3; 707/2; 707/4; 707/5; 707/6; 707/9; 707/10; 707/104.1

(58) Field of Classification Search .............. 707/2, 707/3, 4, 5, 6, 9, 10, 104.1

See application file for complete search history.

(56) References Cited

U.S. PATENT DOCUMENTS 6,990,484 B1 *  1/2006  Ghazal et al. ................. 707/3

OTHER PUBLICATIONS

UVA ODS Specialist, Applying Conditions and Parameters, Jun. 17, 2002, University of Virginia, pp. 1-18.*

* cited by examiner

*Primary Examiner*—Jeffrey Gaffin
*Assistant Examiner*—Farhan M. Syed
(74) *Attorney, Agent, or Firm*—Howard Speight

(57) ABSTRACT

Methods, computer programs, and database systems for analyzing one or more queries are disclosed. Queries may include one or more conditions and one or more sub-queries, with each sub-queries introduced by connecting condition. The method determines the satisfiability of the query, including the satisfiability of the connecting conditions and conditions in the sub-queries. Queries may include one or more conditions of the form (X+Y OP C). The method determines the satisfiability of the query, including the satisfiability of the conditions of the form (X+Y OP C).

39 Claims, 16 Drawing Sheets

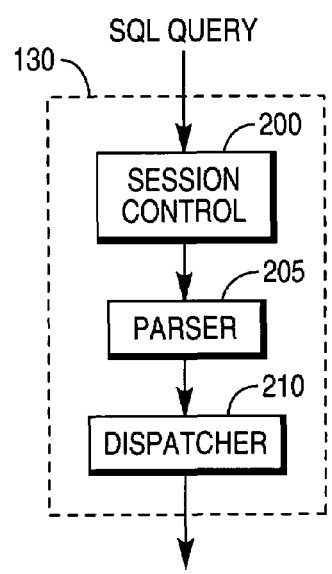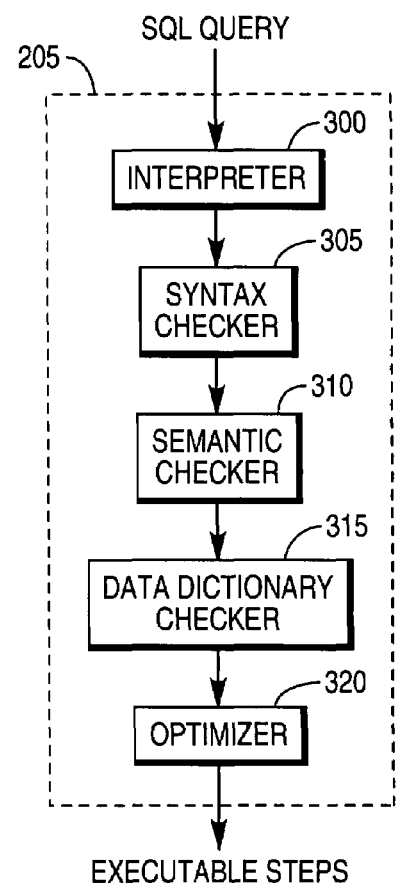

PROCESSING DATABASE QUERIES

BACKGROUND

SQL queries frequently include one or more conditions, or constraints. The constraints are typically found in query WHERE clauses. Constraints can be contradictory (the opposite is called "satisfiable"). For example, a query like "SELECT * FROM Table1 WHERE Table1.C1=1 AND Table1.C1>5" will always return no rows regardless of the data in T1. This is true since C1=1 and C1>5 is always false for all values of C1. Checking if a set of constraints are satisfiable could be very useful in database management system. If the query optimizer of the database has the ability to check if a set of conditions is satisfiable, then such non-satisfiable queries could be answered immediately without accessing the data.

Transitive closure, or TC, of a set of constraints S1, denoted by TC(S1), is the set of all possible derivable constraints from S1. For example if S1 is (a=b and a=1) then TC(S1) will be (b=1). As illustrated in this simple example, a query can be executed more efficiently if its TC can be determined before execution.

SUMMARY

In general, in one aspect, the invention features a method for analyzing a query including one or more conditions and one or more sub-queries. The conditions include one or more connecting conditions that introduce the sub-query in the query. Each of the sub-queries includes zero or more conditions. The method includes determining the satisfiability of the query, including: determining the satisfiability of the connecting conditions; and determining the satisfiability of the conditions in the sub-queries.

Implementations of the invention may include one or more of the following. Determining the satisfiability of the query may further include determining the satisfiability of all other conditions. Determining the satisfiability of the conditions may include creating and populating a global conditions set and determining the satisfiability of the global conditions set. The query may include a clause of the form (X CC (SELECT Y FROM T)), where CC is a connecting condition, X and Y are variables, and T is a set of one or more tables or views. Populating the global conditions set may include: if CC is "IN," adding (X=Y) to the global conditions set; if CC is "NOT IN," adding (X< >Y) to the global conditions set; and if CC includes arithmetic comparison COMP, adding (X COMP Y) to the global conditions set. The query may includes a clause of the form (CC (SELECT Y FROM T WHERE R)), where CC is a connecting condition, Y is a variable, T is a set of one or more tables or views, and R is a set of one or more conditions. Populating the global conditions set may include adding R to the global conditions set. Determining the satisfiability of the global conditions set may include: converting the form of the conditions in the global conditions set to less-than-or-equal-to conditions; creating a map M of the less-than-or-equal-to conditions; finding the shortest path between all nodes in M; and determining if M has a negative cycle and, if it does, returning that the query is not satisfiable. Creating the map M of the conditions in the global conditions set may include: creating a node for each of the variables in the conditions; creating a node for 0; creating a directed edge from a node representing a first variable, S, to a node representing a second variable, T, with a cost, C, for conditions of the form (S<=T+C); creating a directed edge from a node representing a first variable, S, to the 0 node, with cost C, for conditions of the form (S<=0+C); and creating a directed edge from the 0 node to a node representing a first variable, S, with cost C, for conditions of the form (0<=X+C). Finding the shortest path between all nodes in M may include running the Floyd-Warshall Shortest Path Algorithm against M. Determining if M has a negative cycle may include determining if M includes a negative cost edge from a node to itself. Analyzing the query may further include determining the transitive closure of the conditions and, if necessary, modifying the conditions. The query may include an outer query block and an inner query block. Determining the transitive closure of the conditions and modifying the conditions may include determining the transitive closure of conditions in the outer query block and, if necessary, modifying the conditions in the outer query block and determining the transitive closure of conditions in the inner query block and, if necessary, modifying the conditions in the inner query block. Determining the transitive closure of the conditions may include creating and populating a global conditions set including conditions from the outer query block and the inner query block; and determining the transitive closure of the global conditions set. The transitive closure may include one or more transitive closure conditions. Modifying the conditions to achieve transitive may include: for each transitive closure condition of the form (COL COMP C), where COL is a column, COMP is a comparison, and C is a constant: if COL appears in the outer query block, adding the transitive closure condition to the outer query block; and if COL appears in the inner query block, adding the transitive closure condition to the inner query block.

In general, in another aspect, the invention features a method for analyzing a query including one or more conditions of the form (X+Y OP C), where X and Y are variables, C is a constant, and OP is an operator. The method includes determining the satisfiability of the query, including determining the satisfiability of the one or more conditions of the form (X+Y OP C).

Implementations of the invention may include one or more of the following. A negation of OP may be represented by the operator OP'. Determining the satisfiability of the query may includes assigning conditions of the form (X OP Y+C) to a set S1; assigning condition of the form (X+Y OP C) to a set S2; assigning conditions of the form (X OP C) to a set S3; replacing each conditions in set S2 with two conditions in the form (Y OP −X+C) and (X OP −Y+C); if −X is present in set S2: for each condition in set S3: adding a condition of the form (−X OP' −C) to set S3; and determining the satisfiability of the group of conditions (S1 UNION S2 UNION S3). Determining the satisfiability of the group of conditions may include: converting the conditions to less-than-or-equal-to conditions; creating a map M of the less-than-or-equal-to conditions; finding the shortest path between all nodes in M; and determining if M has a negative cycle and, if it does, returning that the conditions are not satisfiable. Creating the map M of the conditions in the global conditions set may include: creating a node for each of the variables in the conditions, including creating separate nodes for variables with opposite signs; creating a node for 0; creating a directed edge from a node representing a first variable, S, to a node representing a second variable, T, with a cost, C, for conditions of the form (S<=T+C); creating a directed edge from a node representing a first variable, S, to the 0 node, with cost C, for conditions of the form (S<=0+C); and creating a directed edge from the 0 node to a node representing a first variable, S, with cost C, for conditions of the form (0<=X+C). Analyzing the query may further include: determining the transitive closure of the conditions and, if necessary, modifying the conditions.

In general, in another aspect, the invention features a method for analyzing a query, where the query includes one or more conditions and one or more sub-queries, the conditions including one or more connecting conditions that introduce the sub-query in the query, each of the sub-queries including zero or more conditions. The method includes creating a Global Conditions set including one or more conditions representing one or more connecting conditions.

In general, in another aspect, the invention features a method for analyzing a query, where the query includes one or more conditions and one or more sub-queries, the conditions including one or more connecting conditions that introduce the sub-query in the query, each of the sub-queries including zero or more conditions. The method includes creating a Transitive Closure set of conditions based on one or more connecting conditions.

In general, in another aspect, the invention features a computer program, stored on a tangible storage medium, for use in analyzing one or more database queries, each query including one or more conditions and one or more sub-queries, the conditions including one or more connecting conditions that introduce the sub-query in the query, each of the sub-queries including zero or more conditions. The computer program includes executable instructions that cause a computer to determine the satisfiability of the query. The executable instructions for determining the satisfiability of the query cause the computer to determine the satisfiability of the connecting conditions; and determine the satisfiability of the conditions in the sub-queries.

In general, in another aspect, the invention features A computer program, stored on a tangible storage medium, for use in analyzing one or more database queries, each query including one or more conditions of the form (X+Y OP C), where X and Y are variables, C is a constant, and OP is an operator. The executable instructions that cause a computer to determine the satisfiability of the query. The executable instructions for determining the satisfiability of the query cause the computer to determine the satisfiability of the one or more conditions of the form (X+Y OP C).

In general, in another aspect, the invention features a database system including a massively parallel processing system including: one or more nodes; a plurality of CPUs, each of the one or more nodes providing access to one or more CPUs; a plurality of data storage facilities each of the one or more CPUs providing access to one or more data storage facilities. The database includes a process for execution on the massively parallel processing system for analyzing one or more database queries, each query including one or more conditions and one or more sub-queries, the conditions including one or more connecting conditions that introduce the sub-query in the query, each of the sub-queries including zero or more conditions. The process includes determining the satisfiability of the query. The process for determining the satisfiability of the query includes determining the satisfiability of the connecting conditions; and determining the satisfiability of the conditions in the sub-queries.

In general, in another aspect, the invention features: a database system including a massively parallel processing system including one or more nodes; a plurality of CPUs, each of the one or more nodes providing access to one or more CPUs; and a plurality of data storage facilities each of the one or more CPUs providing access to one or more data storage facilities. The database system includes a process for execution on the massively parallel processing system for analyzing one or more database queries, each query including one or more conditions of the form (X+Y OP C), where X and Y are variables, C is a constant, and OP is an operator. The process includes determining the satisfiability of the query, including determining the satisfiability of the one or more conditions of the form (X+Y OP C).

BRIEF DESCRIPTION OF THE DRAWINGS

FIG. 2 is a block diagram of a parsing engine.
FIG. 3 is a flow chart of a parser.

DETAILED DESCRIPTION

Figure 1:
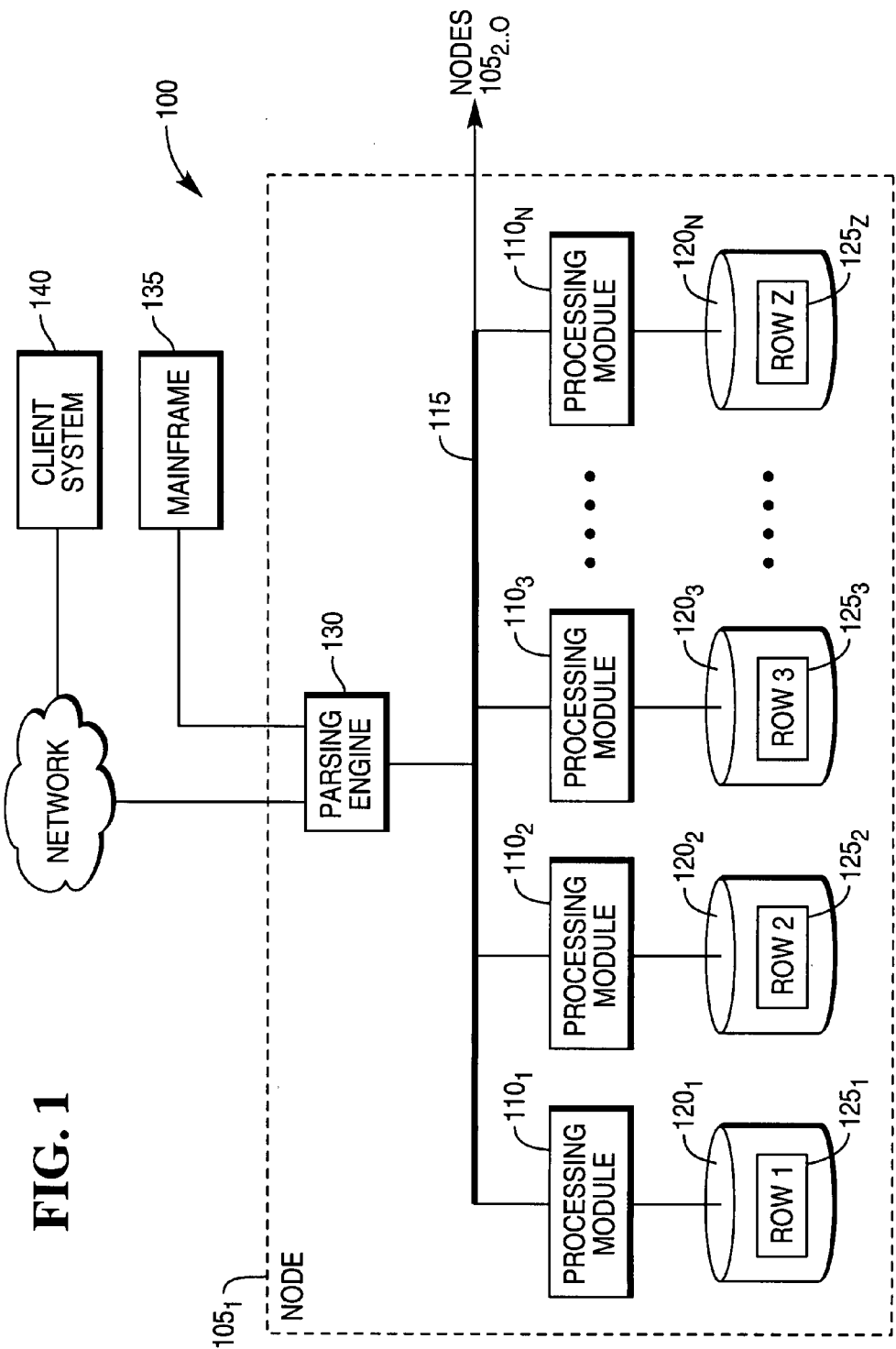
FIG. 1 is a block diagram of a node of a database system.

The techniques for processing database queries disclosed herein have particular application, but are not limited, to large databases that might contain many millions or billions of records managed by a database system ("DBS") 100, such as a Teradata Active Data Warehousing System available from NCR Corporation. FIG. 1 shows a sample architecture for one node $105_1$ of the DBS 100. The DBS node $105_1$ includes one or more processing modules $110_{1 \ldots N}$, connected by a network 115, that manage the storage and retrieval of data in data-storage facilities $120_{1 \ldots N}$. Each of the processing modules $110_{1 \ldots N}$ may be one or more physical processors or each may be a virtual processor, with one or more virtual processors running on one or more physical processors.

For the case in which one or more virtual processors are running on a single physical processor, the single physical processor swaps between the set of N virtual processors.

For the case in which N virtual processors are running on an M-processor node, the node's operating system schedules the N virtual processors to run on its set of M physical processors. If there are 4 virtual processors and 4 physical processors, then typically each virtual processor would run on its own physical processor. If there are 8 virtual processors and 4 physical processors, the operating system would schedule the 8 virtual processors against the 4 physical processors, in which case swapping of the virtual processors would occur.

Each of the processing modules $110_1 \ldots _N$ manages a portion of a database that is stored in a corresponding one of the data-storage facilities $120_1 \ldots _N$. Each of the data-storage facilities $120_1 \ldots _N$ includes one or more disk drives. The DBS may include multiple nodes $105_2 \ldots _O$ in addition to the illustrated node $105_1$, connected by extending the network 115.

The system stores data in one or more tables in the data-storage facilities $120_1 \ldots _N$. The rows $125_1 \ldots _Z$ of the tables are stored across multiple data-storage facilities $120_1 \ldots _N$ to ensure that the system workload is distributed evenly across the processing modules $110_1 \ldots _N$. A parsing engine 130 organizes the storage of data and the distribution of table rows $125_1 \ldots _Z$ among the processing modules $110_1 \ldots _N$. The parsing engine 130 also coordinates the retrieval of data from the data-storage facilities $120_1 \ldots _N$ in response to queries received from a user at a mainframe 135 or a client computer 140. The DBS 100 usually receives queries and commands to build tables in a standard format, such as SQL.

In one implementation, the rows $125_1 \ldots _Z$ are distributed across the data-storage facilities $120_1 \ldots _N$ by the parsing engine 130 in accordance with their primary index. The primary index defines the columns of the rows that are used for calculating a hash value. The function that produces the hash value from the values in the columns specified by the primary index is called the hash function. Some portion, possibly the entirety, of the hash value is designated a "hash bucket." The hash buckets are assigned to data-storage facilities $120_1 \ldots _N$ and associated processing modules $110_1 \ldots _N$ by a hash bucket map. The characteristics of the columns chosen for the primary index determine how evenly the rows are distributed.

In one example system, the parsing engine 130 is made up of three components: a session control 200, a parser 205, and a dispatcher 210, as shown in FIG. 2. The session control 200 provides the logon and logoff function. It accepts a request for authorization to access the database, verifies it, and then either allows or disallows the access.

Once the session control 200 allows a session to begin, a user may submit a SQL query, which is routed to the parser 205. As illustrated in FIG. 3, the parser 205 interprets the SQL query (block 300), checks it for proper SQL syntax (block 305), evaluates it semantically (block 310), and consults a data dictionary to ensure that all of the objects specified in the SQL query actually exist and that the user has the authority to perform the request (block 315). Finally, the parser 205 runs an optimizer (block 320), which develops the least expensive plan to perform the request.

The DBS 100 accepts and processes SQL queries that include one or more sub-queries. An example of such a SQL query is:

SELECT * FROM t1 WHERE c1>1 and c1<(SELECT maxc2 FROM v1 WHERE maxc2<5);

where t1 is a table, c1 is a column in t1, v1 is a view, and maxc2 is column defined in the view v1 defined by "SELECT max(c2) as maxc2 from t2." The example SQL query has an outer condition block that includes "c1>1" and an inner condition block that includes "maxc2<5." The sub-query is introduced by a connecting condition, "c1<."

Other example SQL queries with sub-queries include the following connecting conditions: IN, NOT IN, EXISTS, X OP, X OP ANY, X OP ALL, where X is a variable or a column and OP is an arithmetic comparison (e.g., >, <, =, < >, >=, <=).

While the example SQL query above is a SELECT request, other types of example SQL queries (e.g., UPDATE, INSERT, or DELETE requests) include sub-queries.

The DBS 100 also accepts and processes SQL queries that include one or more conditions of the form (X+Y OP C), where X and Y are variable or columns, OP is an arithmetic comparison, and C is a constant. An example of such a SQL query is:

SELECT * FROM HighPay WHERE A <=20000 OR B<=20000;

where the view HighPay is created by the following SQL query:

CREATE VIEW HighPay as SELECT E1.Name, E2.Name,E1.Salary A,E2.Salary B FROM Employee E1, Employee E2 WHERE E1.SEmpNum=E2.EmpNum AND E1.EmpNum > E2.EmpNum AND A+B>=100000;

In the SQL query above the DBS 100 will evaluate the condition "A+B>=100000," which is of the form (X+Y OP C).

Another example SQL query that involves a condition of the form (X+Y OP C) is:

SELECT * FROM LowPay WHERE A >=120000;

where the view HighPay is created by the following SQL query:

CREATE VIEW LowPay AS SELECT E1.Name, E2.Name,E1.Salary A,E2.Salary B FROM Employee E1, Employee E2 WHERE E1.SEmpNum=E2.EmpNum AND E1.EmpNum > E2.EmpNum AND A+B<=50000;

The SQL query above will always return a null result because there cannot be any rows in the LowPay view where one of the employee's salary is above $120,000, because the combined salaries of the two employees must be less than $50,000 (assuming no negative values of Salary).

Figure 4:
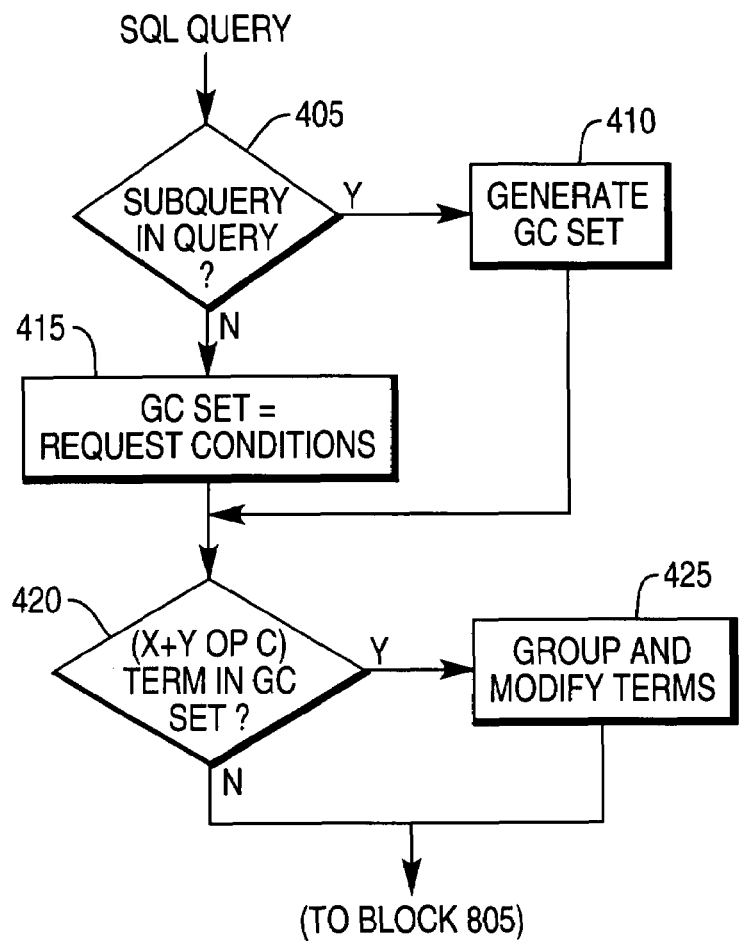
FIG. 4 is a flow chart of a system for processing a SQL query.

FIG. 4 shows an example system for processing SQL queries containing sub-queries or terms of the form (X+Y OP C). The system receives the SQL query and determines if the SQL query contains a sub-query (block 405). If it does, the system generates a Global Conditions (GC) set (block 410, which is shown in greater detail in FIG. 5) which, at the end of the process about to be described, is a set of all of the conditions described in the query. If the SQL query does not contain a sub-query, the system sets the GC set to the conditions in the SQL query (block 415). The system then determines if the SQL query includes one or more conditions of the form (X+Y OP C) (block 420), and, if so, the system groups and modifies the conditions (block 425, which is shown in greater detail in FIGS. 6 and 7) and proceeds to block 805 (see FIG. 8).

Figure 5:
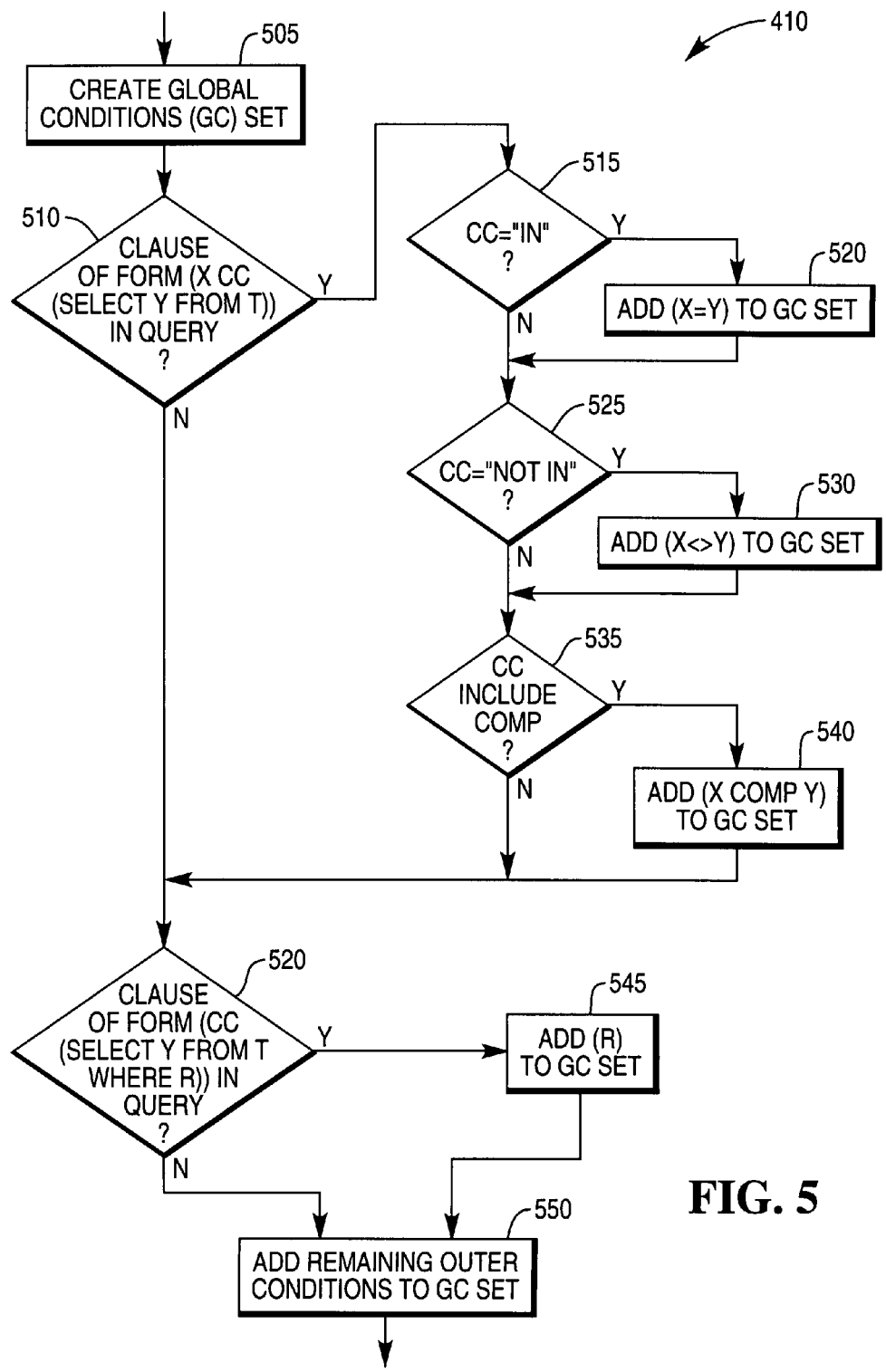
FIG. 5 is a flow chart of a system for grouping and modifying a global conditions set.

FIG. 5 shows an example system for generating a global condition set from a SQL query that contains a sub-query (block 410). The system creates a global conditions (GC) set (block 505). The system determines if the SQL query includes a clause of the form (X CC (SELECT Y FROM T)), where X is a variable or a column name, CC is a connecting condition (e.g., IN, EXISTS, or a logical comparison), Y is a variable or a column, and T is a set of one or more tables or views (block 510). In other implementations, the variables X and Y are sets of variables. If the SQL query contains a clause of the form (X CC (SELECT Y FROM T)), the system proceeds to block 515, otherwise the system proceeds to block 520 (block 510).

In block 515, if CC is "IN," the system adds a (X=Y) term to the GC set (block 420) and proceeds to block 525; otherwise (e.g., if CC is not "IN"), the system proceeds directly to block 525. In block 525, if CC is "NOT IN," the system adds a (X< >Y) term to the GC set (block 530) and proceeds to block 440; otherwise (e.g., if CC is not "NOT IN"), the system proceeds directly to block 535. In block 535, if CC includes "COMP," where "COMP" is an arithmetic comparison (e.g., >, <, =, < >, >=, <=), the system adds a (X COMP Y) term to the GC set (block 540) and proceeds to block 520; otherwise, if CC is not of the form "COMP," the system proceeds directly to block 520.

In certain example SQL queries, "ANY" or "ALL" follow COMP. One example system will perform conversion of SQL queries with "ANY" OR "ALL" conditions before populating the GC set. For example, the system may convert the following SQL query:

SELECT * FROM t1 WHERE t1.c1 > ALL (select c2 from t2);

to

SELECT * FROM t1 WHERE t1.c1 > (select max(c2) FROM t2);

before populating the GC set.

Returning to block 510, if the SQL query does not contain a clause of the form (X CC (SELECT F FROM T)), the system proceeds to block 520, where it determines if the SQL query contains a clause of the form (CC (SELECT Y FROM T WHERE R)), where CC is a connecting condition, Y is a variable or a columns, T is a set of one or more tables, and R is a set of one or more conditions. If the SQL query contains a clause of the form (CC (SELECT Y FROM T WHERE R)), the system adds the one or more conditions R to the GC set (block 545) and proceeds to block 550. The system then adds the remaining outer conditions (e.g., the non-connecting conditions) from the outer query block to the GC set (block 550). In another implementation, the system does not add the one or more conditions R to the GC set (block 545). For example, the system may selectively skip block 545 based on the connecting condition CC.

Figure 6:
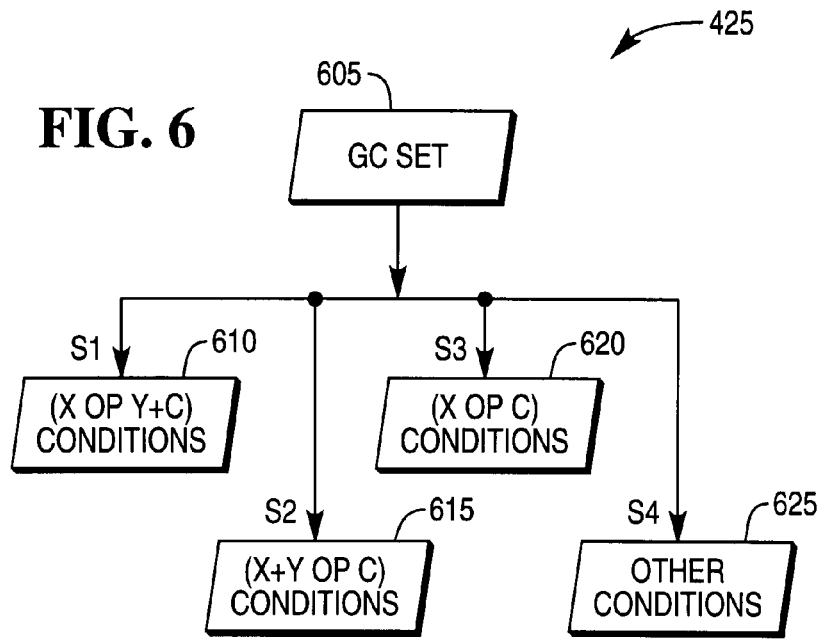
FIG. 6 is a flow chart of a system for sorting a global conditions set.
Figure 7:
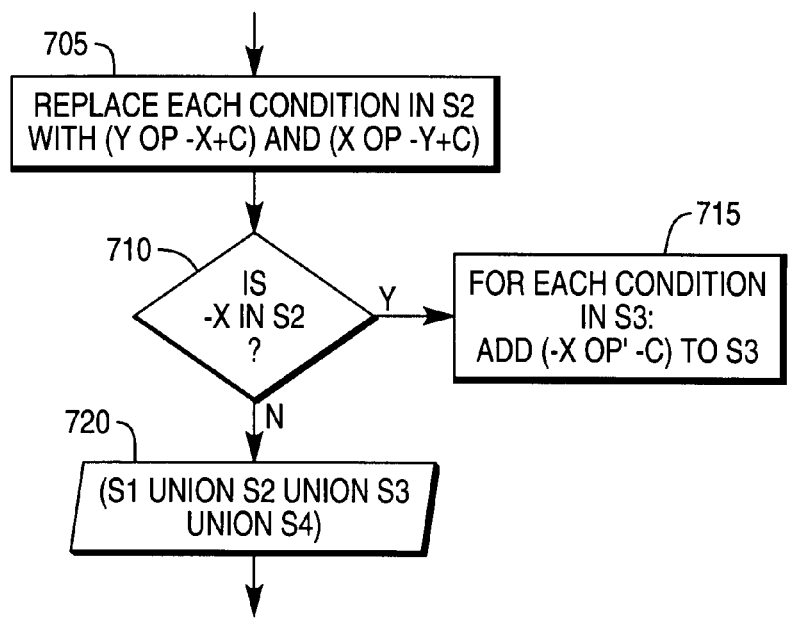
FIG. 7 is a flow chart of a system for modifying conditions.

FIGS. 6 and 7 show an example system for grouping and modifying the conditions in a SQL query that includes one or more conditions of the form (X+Y OP C) (block 425). FIG. 6 shows an example system for grouping the conditions into four sets: S1, S2, S3, and S4. The system receives the GC set (block 605). It places conditions of the form (X OP Y+C) into S1 (block 610), conditions of the form (X+Y OP C) into S2 (block 615), conditions of the form (X OP C) into S3 (block 620), and all other conditions into S4 (block 625).

FIG. 7 shows an example system for modifying the conditions in S2 and S3. The system replaces each condition in S2 with a condition of the form (Y OP −X+C) and a condition of the form (X OP −Y+C) (block 705). The system determines if there is a condition in S2 that includes −X (e.g., Y OP −X+C) (block 710), and if so, for each condition in S3, the system adds a condition of the form (−X OP' −C) to S3 (block 715), where OP' is the negation of OP. For example, if OP is "<," then OP' is ">=." In another implementation, the system determines if there is a condition in S2 that includes −X (e.g., Y OP −X+C) (block 710), before executing block 705. The system returns the union of S1, S2, S3, and S4 (block 720).

Figure 8:
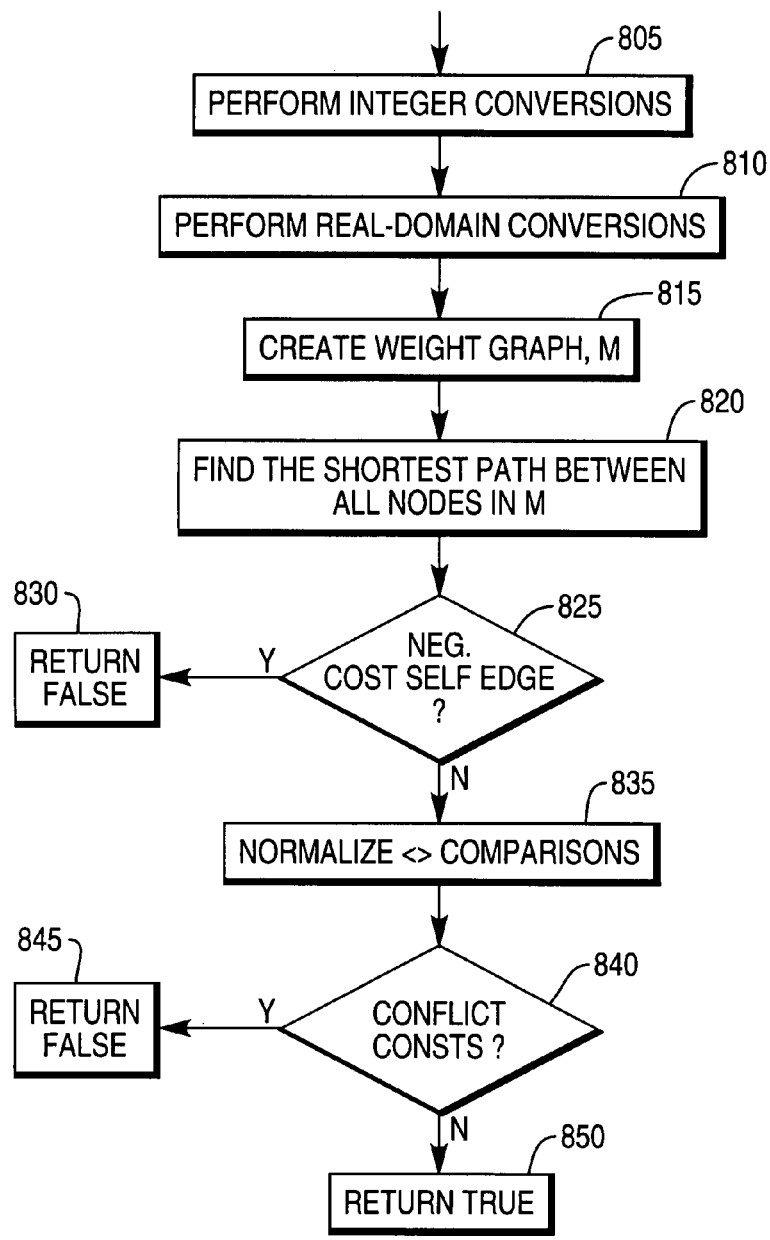
FIG. 8 is a flow chart of a system for determining the satisfiability of conditions.

FIG. 8 shows an example system for determining the satisfiability of a SQL query. The system performs integer conversions (block 805, which is shown in greater detail in FIG. 9), performs real-domain conversions (block 810, which is shown in greater detail in FIG. 10), creates a weight graph M for the conditions in the query (block 815), and finds the shortest path between all modes in M (block 820). The system then determines if nodes in M have a negative cost edge between another node and themselves (block 825).

Figure 9:
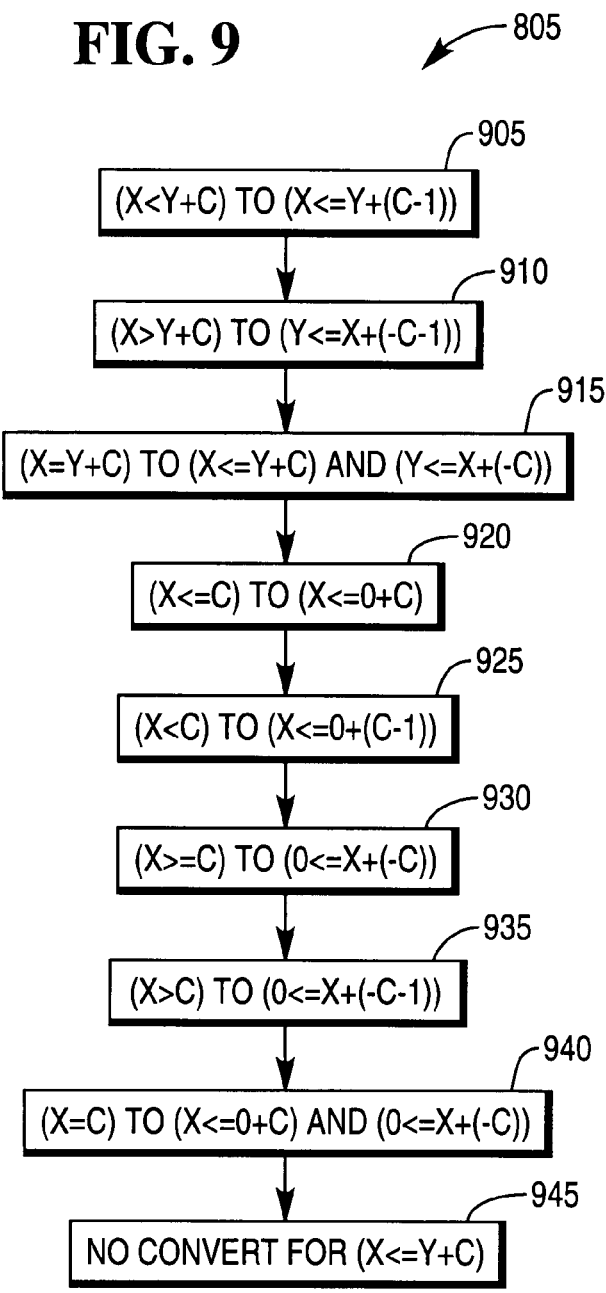
FIG. 9 is a flow chart of a system for modifying integer conditions.

FIG. 9 shows a system for converting integer conditions for use in determining the satisfiability and transitive closure of the GC set (block 805). The system converts:

conditions from the form (X<Y+C) to the form (X<=Y+(C−1)) (block 905);

conditions from the form (X>Y+C) to the form (Y<=X+(−C−1)) (block 910);

conditions from the form (X=Y+C) to the form (X<=Y+C) AND (Y<=X+(−C)) (block 915);

conditions from the form (X<=C) to the form (X<=0+C) (block 920);

conditions from the form (X<C) to the form (X<=0+(C−1)) (block 925);

conditions from the form (X>=C) to the form (0<=X+(−C)) (block 930);

conditions from the form (X>C) to the form (0<=X+(−C−1)) (block 935); and conditions from the form (X=C) to the form (X<=0+C) AND (0<=X+(−C)) (block 940).

The system performs no conversion for condition of the form (X<=Y+C) (block 945). The above conversions will also include conditions of the forms (X<Y), (Y>X), (X=Y), and (Y=X) when C is equal to zero. Negatively signed variables (e.g., −X or −Y) can replace the variables in the conversions.

Figure 10:
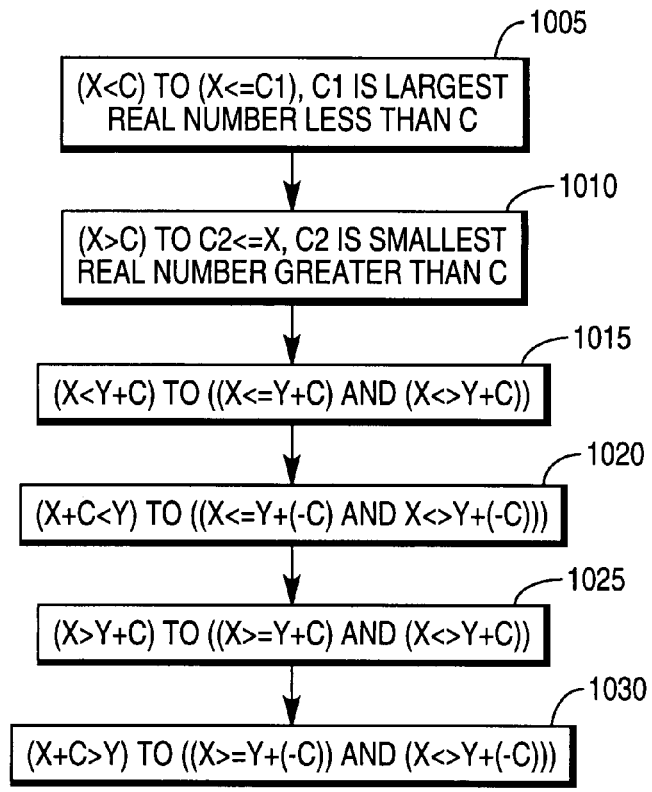
FIG. 10 is a flow chart of a system for modifying real-value conditions.

FIG. 10 shows a system for converting real-domain conditions for use in determining the satisfiability and transitive closure of the GC set (block 810). The system converts:

conditions from the form (X<C) to the form (X<=C1) (block 1005);

conditions from the form (X>C) to the form (C2<=X) (block 1010);

conditions from the form (X<Y+C) to the form (X<=Y+C) AND (X< >Y+C) (block 1015);

conditions from the form (X+C<Y) to the form (X<=Y+(−C)) AND (X< >Y+(−C)) (block 1020);

conditions from the form (X>Y+C) to the form (X>=Y+C) AND (X< >Y+C) (block 1025); and conditions from the form (X+C>Y) to the form (X>=Y+(−C)) AND (X< >Y+(−C)) (block 1030).

In the conversion above, C1 is the largest real number less than C, C2 is the smallest real number greater than C, and one or more of the variables (e.g., X or Y) in each of the conditions are in the real domain.). The above conversions will also include conditions of the forms (X<Y), (Y>X), (X=Y), and (Y=X) when C is equal to zero. Negatively signed variables (e.g., −X or −Y) can replace the variables in the conversions.

Figure 11:
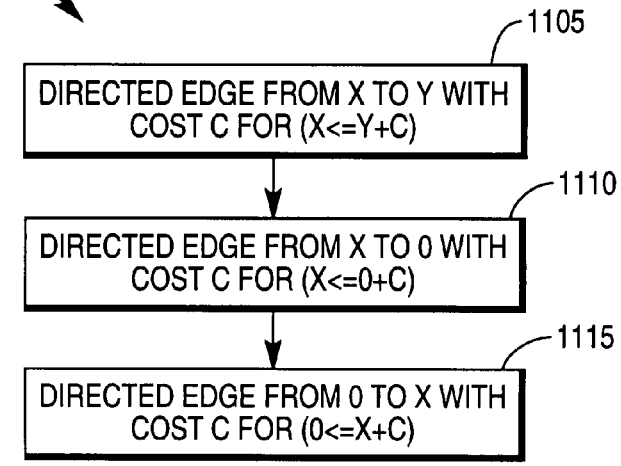
FIG. 11 is a flow chart of a system for creating a map for conditions.

Returning to FIG. 8, after the system has converted the form of the conditions in the GC set, it creates a weighted directed graph M={V,E} (block 815). V is the set of the graph's nodes, where each variable in GC has a unique node. Furthermore, variables with opposite signs (e.g., X and −X each have separate nodes in V). Finally, there is a special node in V for 0. FIG. 11 shows an example system for creating the set of edges. For each condition of the form (X<=Y+C) there is a directed edge from X to Y with cost C (block 1105). For each condition of the form (X<=0+C) there is a directed edge from X to 0 with cost C (block 1110).

For each condition of the form (0<=X+C) there is a directed edge from 0 to X with cost C for (X<=0+C) (block 1115).

After the system creates the map M of nodes (block 815), it determines the shortest path between all the nodes in M (block 820). One example system determines the shortest path using the Floyd-Warshall Shortest Path algorithm. The Floyd-Warshall algorithm takes as an input a weighted directed graph between n variables. Assume that the variables are denoted by {1, 2, . . . w}. A two-dimensional n-by-n distance matrix M is created to represent the distance (or cost) between each pair of the w variables. $M_{I,J}$ represents the distance from I to J and it is set to ∞ if there is no edge from 1 to J. $D^k_{I,J}$ is the shortest path from I to J through at most k edges. The algorithm will return M, which is the updated (shortest) paths between the nodes. The algorithm is expressed in the following pseudo-code:

```
Begin
    D⁰ = M
    for K = 1 to w do
        for I = 1 to w do
            for J = 1 to w do
                D^k_{I,J} = min(D^{k-1}_{I,J}, D^{k-1}_{I,K} + D^{k-1}_{K,J})
    M = D^W
End
```

In the algorithm above, $D^k_{I,J}$ denotes the length of the shortest path from I to J that goes through at most K intermediate vertices.

Returning to FIG. 8, the set of constraints is contradictory, and the GC set is not satisfiable, if M has a negative cost edge from a node to itself (block 825). If the set of constraints is contradictory, the system returns FALSE and terminates (block 830).

The system them normalizes < > conditions in the GC set to either (X< >Y+C) or (X< >C) (block 835). For example, (X−3< >Y+2) is normalized to (X< >Y+5) and (X+2< >4) is normalized to (X< >2). Once the < > comparisons in the GC set are normalized, the system determines if there are conflicts in the GC set (block 840, which is shown in greater detail in FIG. 12) and return FALSE if conflicts exist (block 845). Otherwise, the system returns TRUE (block 850).

Figure 12:
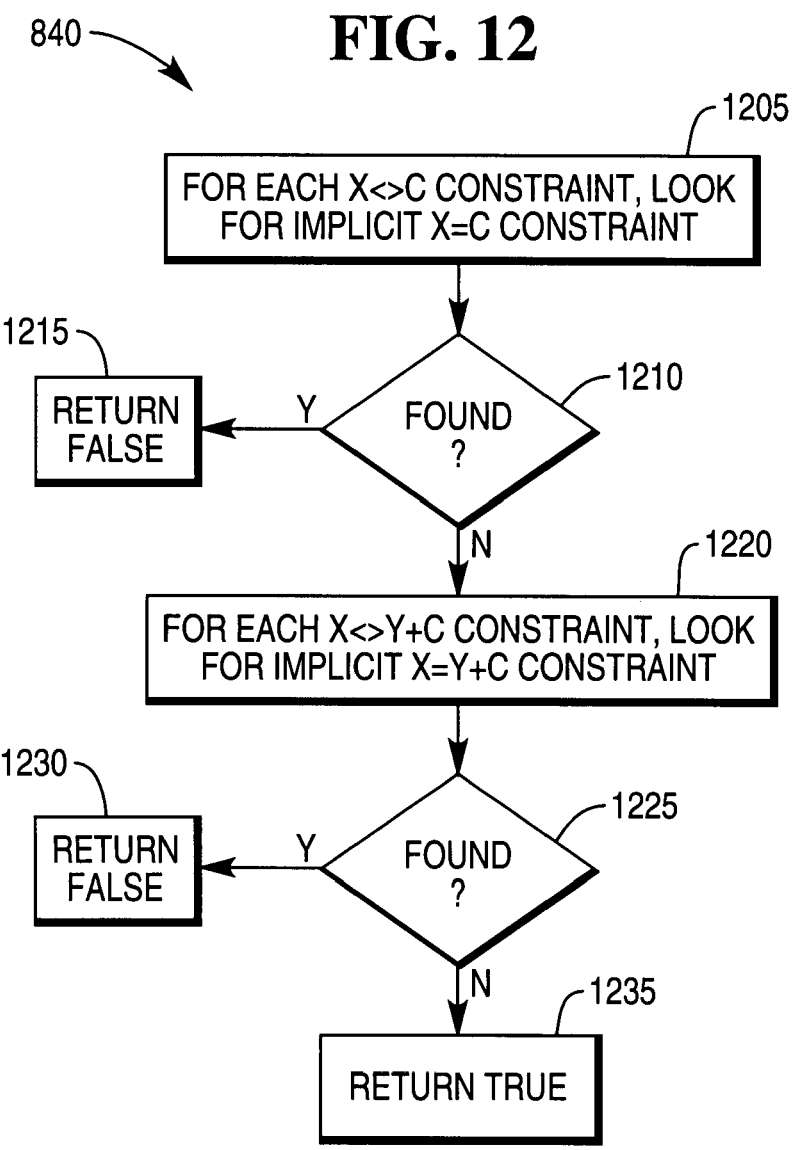
FIG. 12 is a flow chart of a system for detecting constraints.

The system determines if the GC set is not satisfiable by searching for conflicts in the GC set (e.g., conditions that are mutually exclusive). In particular, as shown in FIG. 12, for each constraint of the form (X< >C), if X=C could be implicitly found in M (block 1205, which is shown in greater detail in FIG. 13) then a contradiction is found (block 1210) and FALSE is returned (block 1215). Also, for each constraint of the form (X< >Y+C), if X=Y+C could be implicitly found in M (block 1220) then a contradiction is found (block 1220) and FALSE is returned (block 1230). If, however, neither of the contradictions (in block 1205 or 1220) are found then the system returns TRUE (block 1235).

Figure 13:
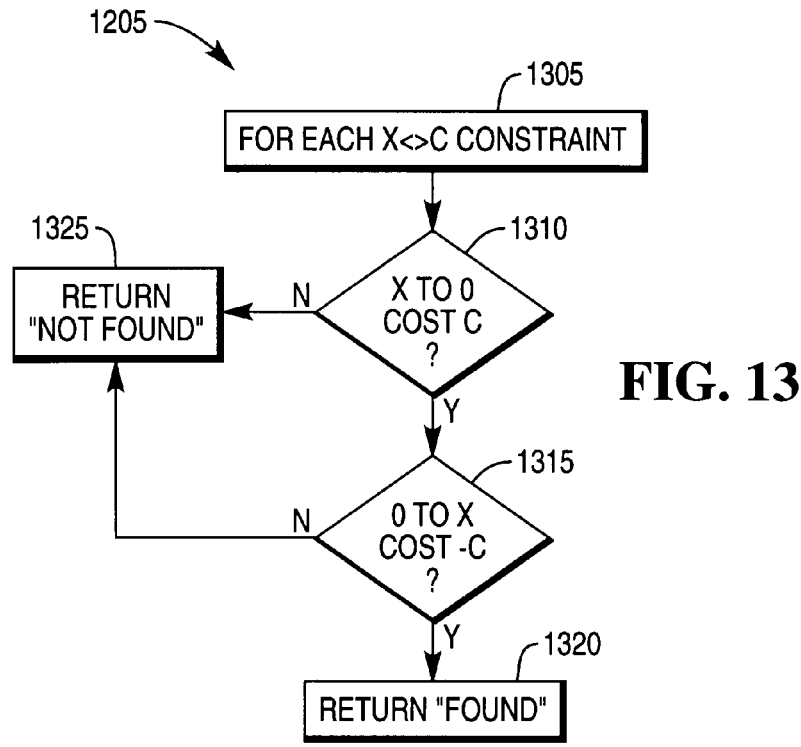
FIG. 13 is a flow chart of a system for detecting constraints.

FIG. 13 shows an example system that searches for implicit X=C constraints in the GC set (block 1205). The system iterates once for each (X< >C) condition in the GC set (block 1305). For each X< >C condition, the system determines whether there is an edge from X to 0 with cost C (e.g., (X<=C)) (block 1310) and an edge from 0 to X with cost −C (e.g., (0<=X−C) or (X>=C)) (block 1315). If both conditions are true, an implicit X=C constraint is found (block 1320), otherwise such a condition is not found (block 1325).

Figure 14:
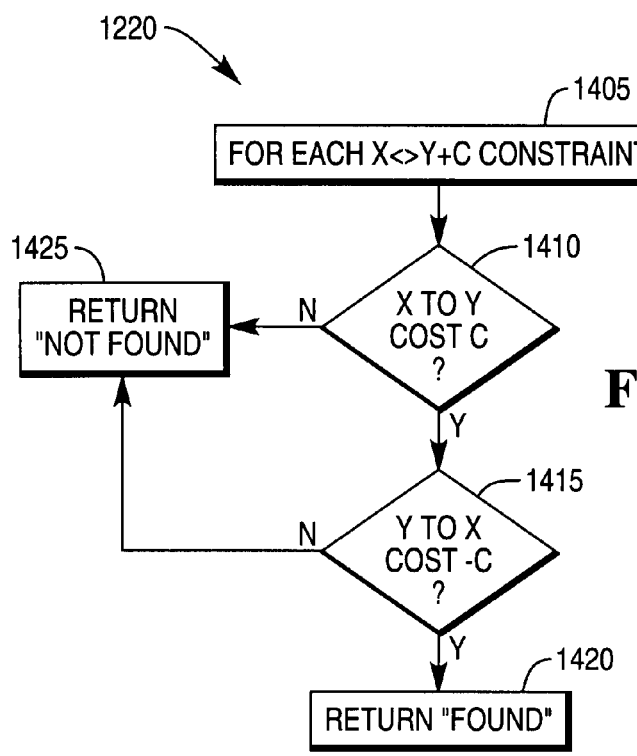
FIG. 14 is a flow chart of a system for detecting constraints.

FIG. 14 shows an example system that searches for implicit X=Y+C constraints in the GC set (block 1220). The system iterates once for each (X< >Y+C) condition in the GC set (block 1405). For each (X< >Y+C) condition the system determines if there is an edge from X to Y with cost C (e.g., (X<=Y+C)) (block 1410) and an edge from Y to X with cost −C (e.g., (Y<=X−C) or (X>=Y+C)) (block 1315). If both conditions are true, an implicit (X=Y+C) constraint is found (block 1420), otherwise such a condition is not found (block 1425). This test also covers the special case of (X< >Y) where C=0.

Figure 15:
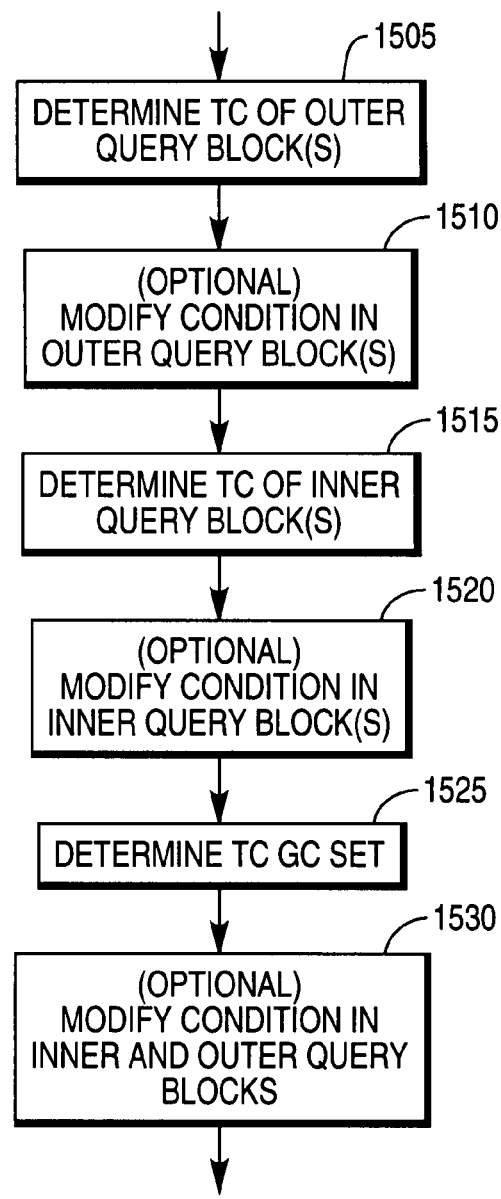
FIG. 15 is a flow chart of a system for finding and applying the transitive closure set.

In addition to determining whether the GC set is satisfiable, the system may also determine the transitive closure (TC) of the SQL query. An example system for determining the TC of a SQL query containing a sub-query is shown in FIG. 15. The system determines the TC of the outer query block(s) (block 1505) and optionally modifies the conditions in the outer query block(s) to achieve transitive closure (block 1510). The system determines the TC of the inner query block(s) (block 1505) and optionally modifies the conditions in the inner query block(s) to achieve transitive closure (block 1510). The system determines the TC of the GC set (block 1505) and modifies the conditions in the inner and outer query blocks to achieve transitive closure (block 1510). For each of these sets of conditions (inner and outer query blocks and the GC set), the system for determining the GC set is the same, but different conditions are passed to the system for determining the TC. If the SQL query does not contain a sub-query, then the system executes block 1505 and 1510. The optional block (1510) is only executed if the conditions in the outer query block should be modified to achieve transitive closure.

Figure 16:
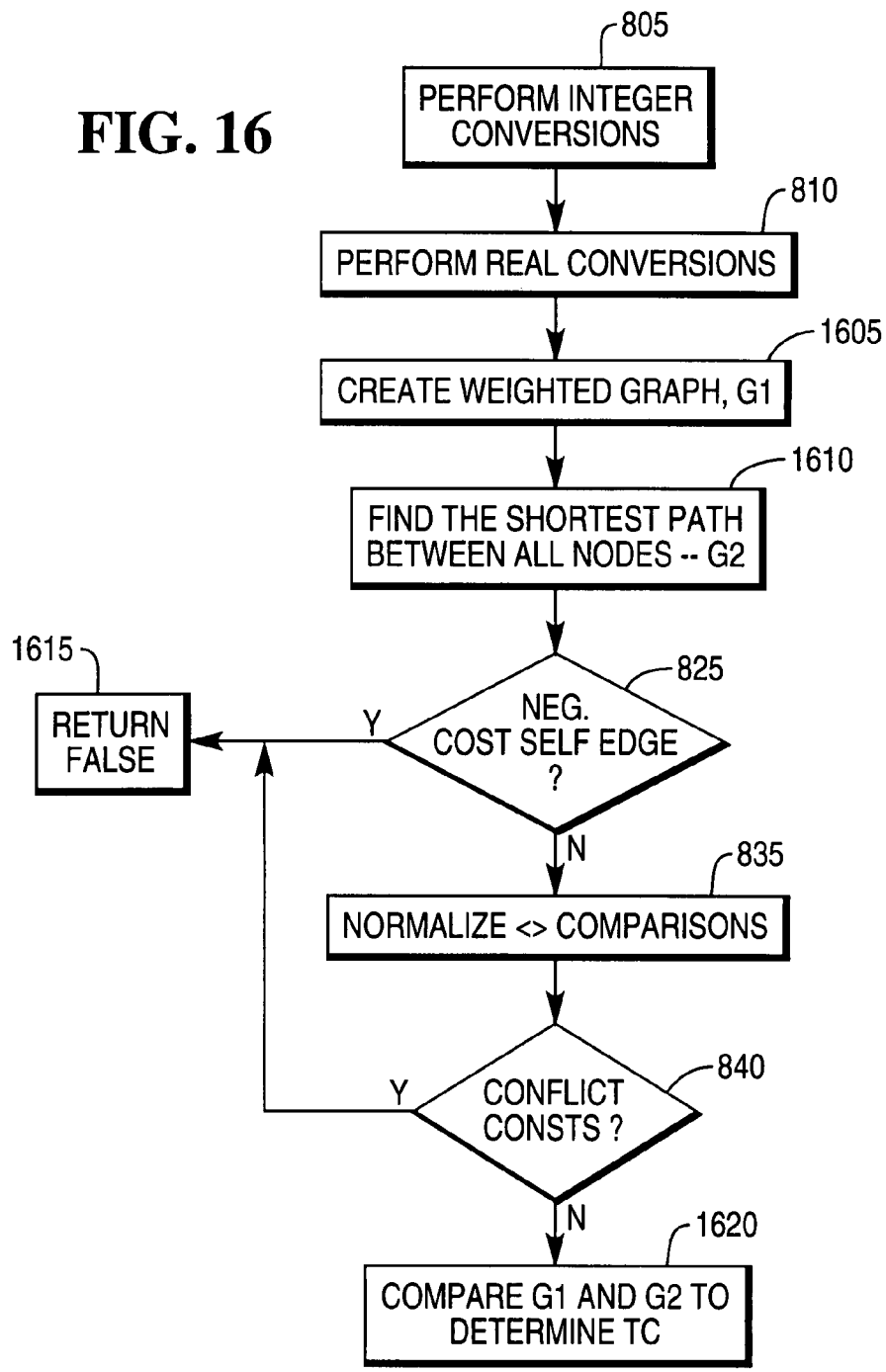
FIG. 16 is a flow chart of a system for determining the transitive closure set.

FIG. 16 shows an example system for determining the TC of a set of conditions and modifying the conditions accordingly (blocks 1505-1530). The system performs the integer conversions (block 805, which is shown in greater detail in FIG. 9 and described with respect to FIG. 8) and the real conversions (block 810, which is shown in greater detail in FIG. 10 and described with respect to FIG. 8). The system then creates a weighted graph M (as described with respect to block 815, which is shown in greater detail in FIG. 11 and discussed with respect to FIG. 8) and saves it as G1 (block 1605). The system makes a copy of G1 called G2 and finds the shortest path between all nodes in G2 (as described with respect to block 820, which is shown in greater detail in FIG. 9 and described with respect to FIG. 8) and saves the resulting graph G2 (block 1610). The system determines if G2 has a negative edge cost (block 825) or if G2 with normalized < > comparisons (block 835) has a contradiction (block 840), and, if either of these are true, the system returns FALSE and ends (block 1615). If G2 does not have a negative edge cost or a contradiction, the system compares G1 and G2 to determine the TC set (block 1620).

Figure 17A:
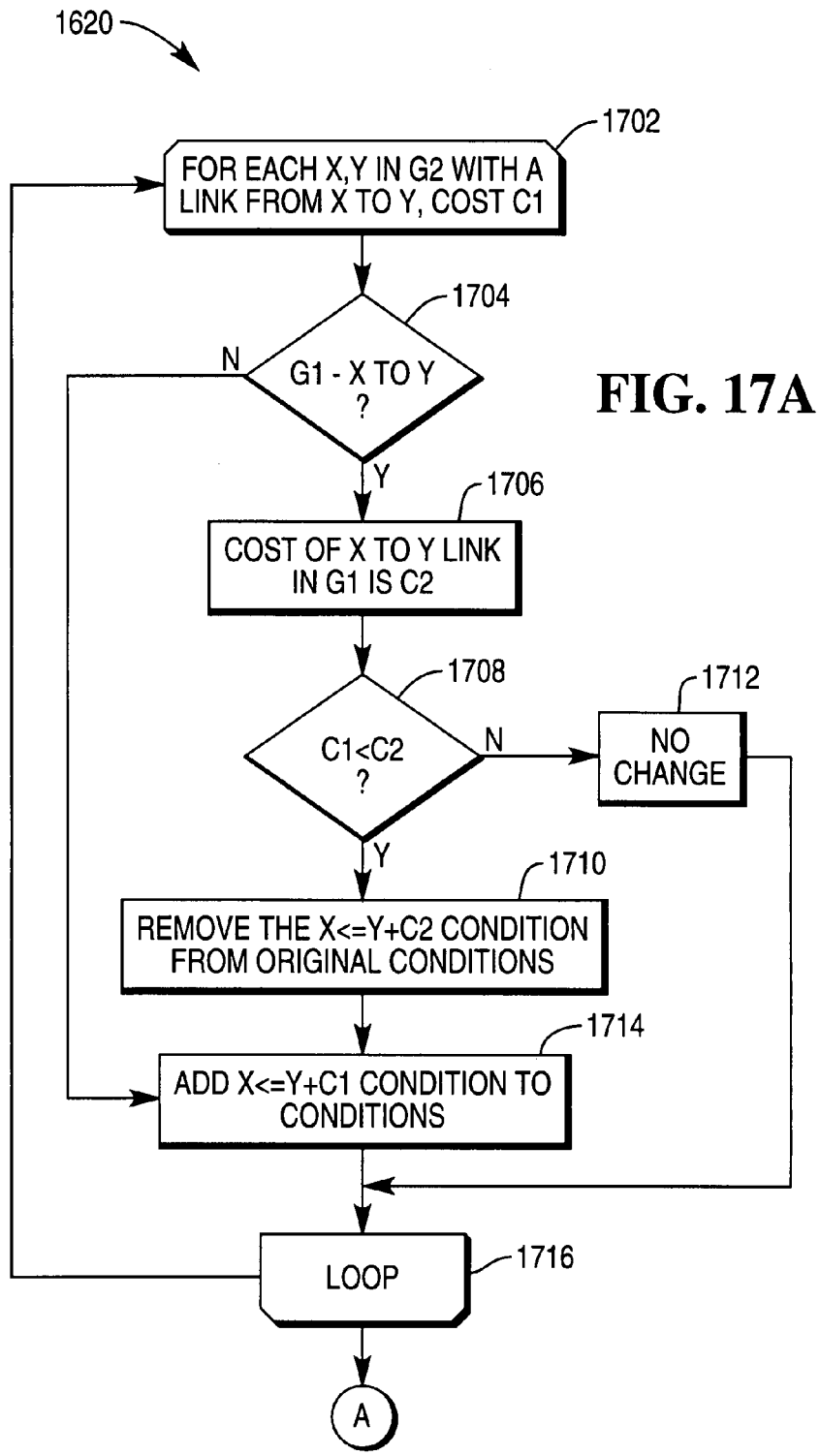
FIGS. 17A-C are a flow chart of a system for determining the transitive closure set.
Figure 17B:
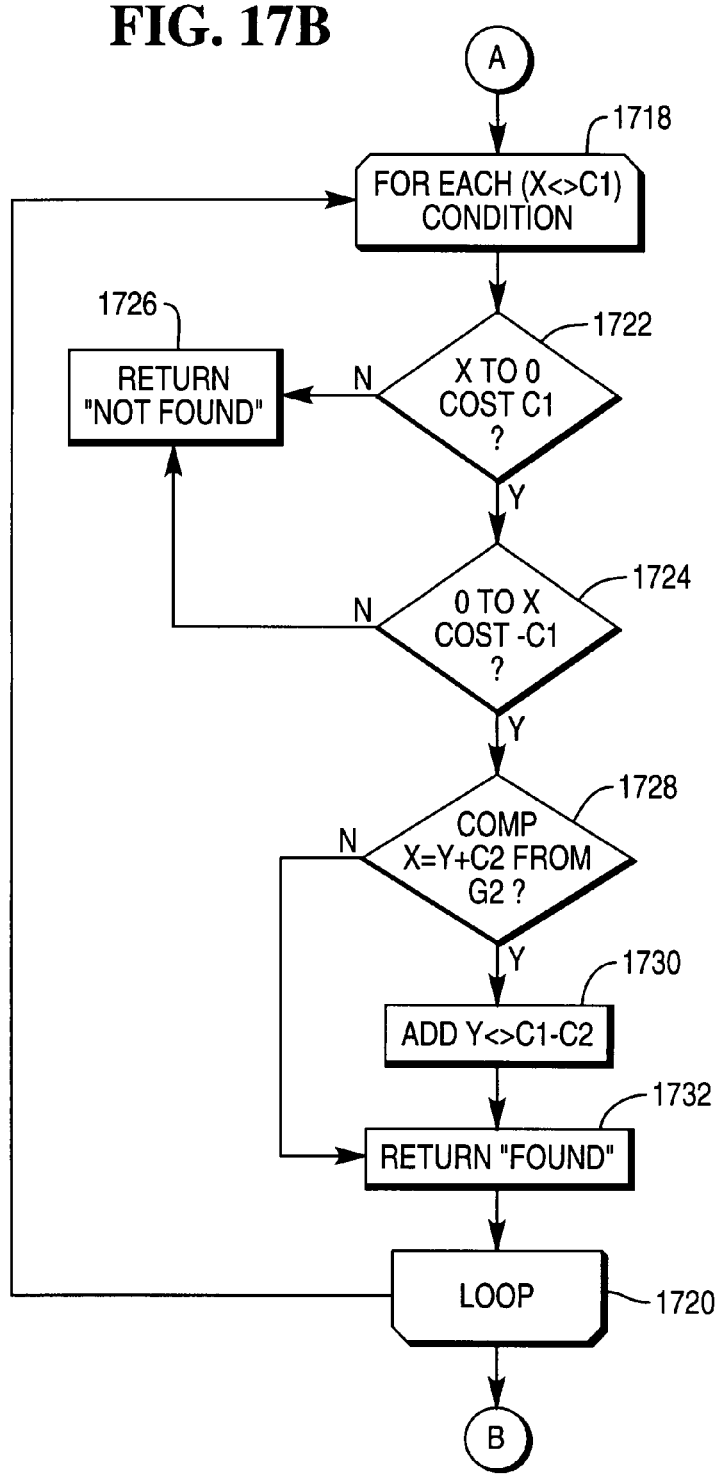
Figure 17C:
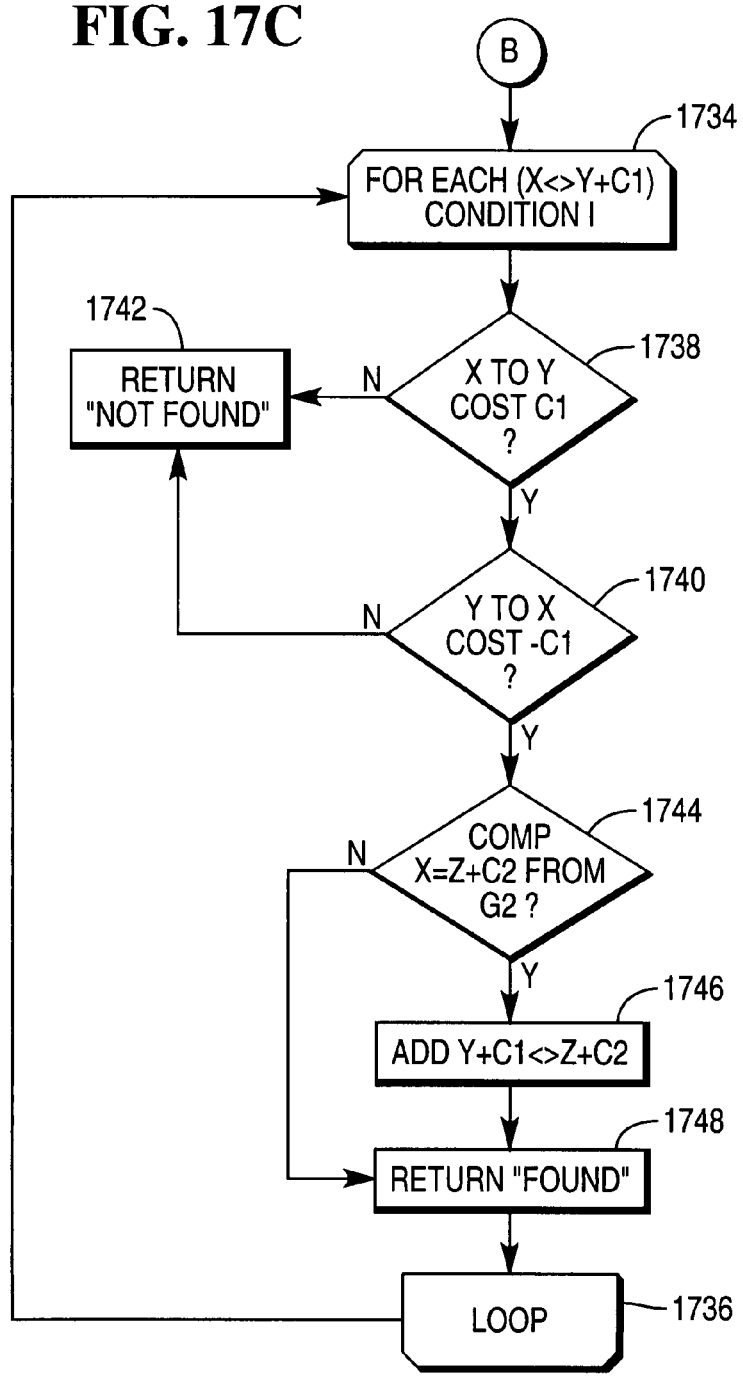

FIGS. 17A, 17B, and 17C show an example system for comparing G1 and G2 to determine the TC set (block 1620). The system loops once for each pair of variables X and Y in G2 for which there is a link from X to Y with cost C1 (blocks 1702 and 1716). Within the loop, the system determines if C1 is less than C2, which is the cost of the shortest path from X to Y in G1 (blocks 1704, 1706, 1708). If C1 is less than C2, the system removes the condition X<=Y+C2 (or the condition that was normalized to X<=Y+C2) from the original condition set (block 1710) and adds X<=Y+C1 to the TC set (block 1714). Otherwise, the system makes no changes (block 1712). If G1 does not have a link from X to Y, the system adds (X<=Y+C1) to the TC set (block 1714).

Turning to FIG. 17B, the system iterates once for each (X< >C1) condition in the condition set (block 1718 and 1720). Within the loop, the system determines if, in G1, there is an edge from X to 0 with cost C1 (e.g., (X<=C1)) (block 1722) and an edge from 0 to X with cost −C1 (e.g., (0<=X−C1) or (X>=C1)) (block 1724). If either conditions is not true the system returns "NOT FOUND" (block 1726). If both condition are true, the system determines if (X=Y+C2) could be computed from G2 (block 1728). If (X=Y+C2) could be computed from G2 then the system adds (Y< >C1−C2) to the TC set (block 1730). The system returns "FOUND" (block 1732).

Turning to FIG. 17B, the system iterates once for each (X< >Y+C1) condition in the condition set (block 1734 and 1736). Within the loop, the system determines if, in G1, there is an edge from X to Y with cost C1 (e.g., (X<=Y+C1)) (block 1738) and an edge from Y to X with cost −C1 (e.g., (Y<=X−C1) or (Y>=C1)) (block 1740). If either condition is not true, the system returns "NOT FOUND" (block 1742). If both condition are true, the system determines if (X=Z+C2) could be computed from G2, where Z is a variable or a column other than X or Y (block 1744). If (X=Y+C2) could be computed from G2 then the system adds (Y+C1< >Z+C2) to the TC set (block 1746). The system returns "FOUND" (block 1748).

Once the system has determined the TC set, it may modify the one or more conditions in the SQL query to achieve transitive closure. If the SQL query does not contain a sub-query, the TC set may be directly added to the conditions (e.g., original condition set UNION TC set).

Figure 18:
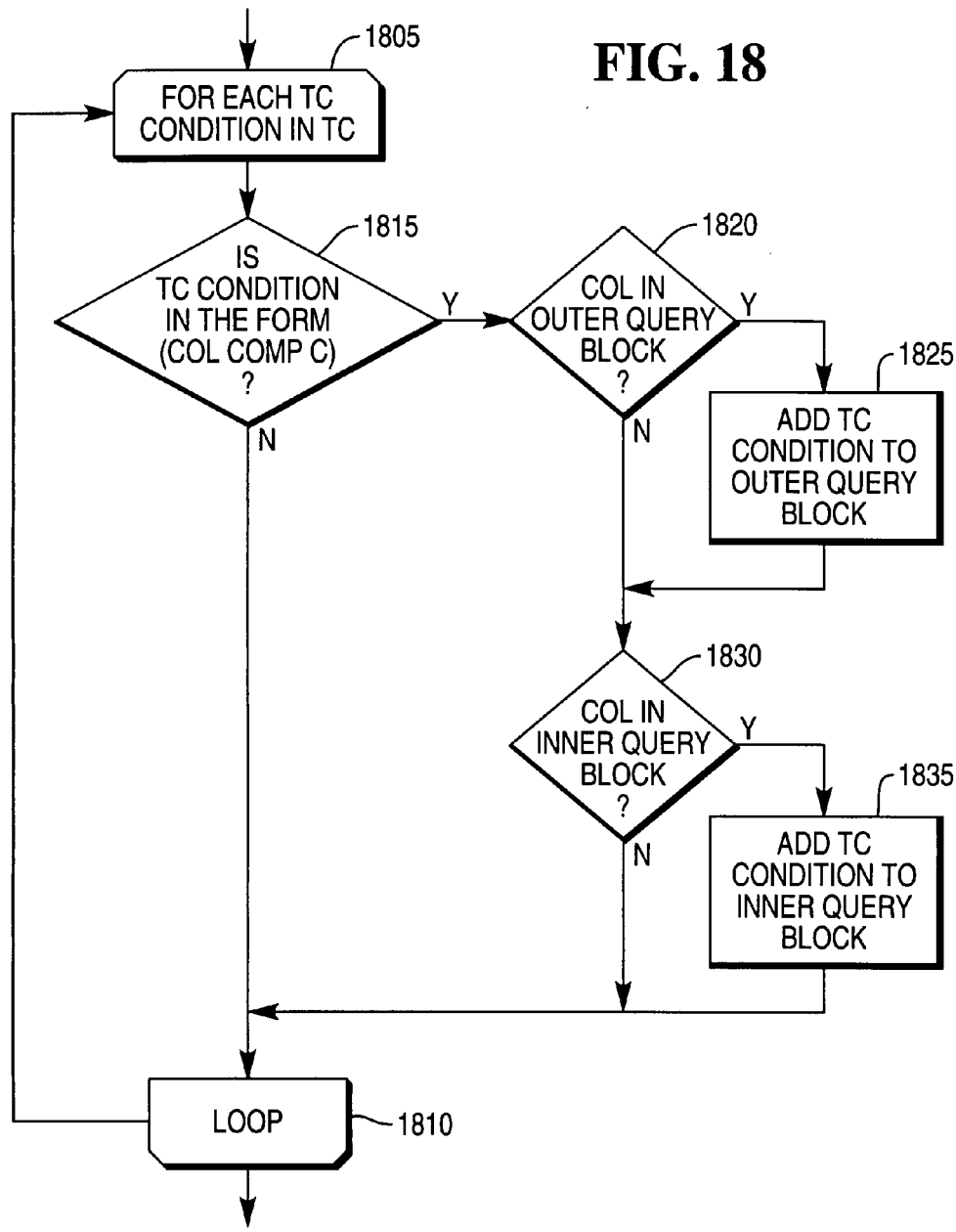
FIG. 18 is a flow chart of a system for applying the transitive closure set

An example system for applying the TC set to a query containing a sub-query is shown in FIG. 18. The system loops once for each TC condition in the TC set (block 1805 and 1810). Within the loop, the system determines if the TC condition is in the form (COL COMP C), where COL is a column, COMP is an arithmetic comparison (e.g., =, < >, >, <, <=, >=), and C is a constant (block 1815), and if so the system determines if the column COL appears in the outer query block (block 1820). If column COL appears in the outer query block the system adds the TC condition to the outer query block (block 1825). The system determines if the column COL appears in the inner query block (block 1830), and if so, it adds the TC condition to the inner query block (block 1835).

For example, in the query:

SELECT * FROM t1,t2 WHERE t1.c1=t2.c1 AND t2.c1=1 AND EXISTS (SELECT * FROM t3 WHERE t1.c1=t3.c2);

If the system determines the TC set for this query is (t1.c1=1 and t3.c2=1), then (t1.c1=1) is added to the inner and outer query blocks since t1.c1 is referenced in both. The term (t3.c2=1) is added to the inner query block only, because that is the only block where the column t3.c2 appears. Adding (t3.c2=1) to the outer query block would require adding t3 to the from clause of the outer query block. The modified query with TC is:

SELECT * FROM t1,t2 WHERE t1.c1=t2.c1 AND t2.c1=1 AND t1.c1=1 AND EXISTS (SELECT * FROM t3 WHERE t1.c1=t3.c2 AND t1.c1=1 AND t3.c2=1);

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer-implemented method for analyzing a query, the query including one or more conditions and one or more sub-queries, the conditions including one or more connecting conditions that introduce the sub-query in the query, each of the sub-queries including zero or more conditions, the method including:
   determining the satisfiability of the query, including:
      determining the satisfiability of the connecting conditions;
      determining the satisfiability of the conditions in the sub-queries; and
      determining the satisfiability of all other conditions;
   where determining the satisfiability of the conditions includes:
      creating and populating a global conditions set; and
      determining the satisfiability of the global conditions set; and
   where the query includes a clause of the form (X CC (SELECT Y FROM T)), where CC is a connecting condition, X and Y are variables or columns, T is a set of one or more tables or views, and where populating the global conditions set includes:
      if CC is "IN," adding (X=Y) to the global conditions set;
      if CC is "NOT IN," adding (X< >Y) to the global conditions set; and
      if CC includes arithmetic comparison COMP, adding (X COMP Y) to the global conditions set.

2. A computer-implemented method for analyzing a query, the query including one or more conditions and one or more sub-queries, the conditions including one or more connecting conditions that introduce the sub-query in the query, each of the sub-queries including zero or more conditions, the method including:
   determining the satisfiability of the query, including:
      determining the satisfiability of the connecting conditions;
      determining the satisfiability of the conditions in the sub-queries; and
      determining the satisfiability of all other conditions;
   where determining the satisfiability of the conditions includes:
      creating and populating a global conditions set; and
      determining the satisfiability of the global conditions set; and
   where the query includes a clause of the form (CC (SELECT Y FROM T WHERE R)), where CC is a connecting condition, Y is a variables or a column, T is a set of one or more tables or views, and R is a set of one or more conditions, and where populating the global conditions set includes adding R to the global conditions set.

3. A computer-implemented method for analyzing a query, the query including one or more conditions and one or more sub-queries, the conditions including one or more connecting conditions that introduce the sub-query in the query, each of the sub-queries including zero or more conditions, the method including:
   determining the satisfiability of the query, including:
      determining the satisfiability of the connecting conditions;
      determining the satisfiability of the conditions in the sub-queries; and
      determining the satisfiability of all other conditions;
   where determining the satisfiability of the conditions includes:
      creating and populating a global conditions set; and determining the satisfiability of the global conditions set; and where determining the satisfiability of the global conditions set includes:
converting the form of the conditions in the global conditions set to less-than-or-equal-to conditions;
creating a map M of the less-than-or-equal-to conditions;
finding the shortest path between all nodes in M; and
determining if M has a negative cycle and, if it does, returning that the query is not satisfiable.

4. The method of claim 3, where creating the map M of the conditions in the global conditions set includes:
creating a node for each of the variables in the conditions;
creating a node for 0;
creating a directed edge from a node representing a first variable, S, to a node representing a second variable, T, with a cost, C, for conditions of the form (S<=T+C);
creating a directed edge from a node representing a first variable, S, to the 0 node, with cost C, for conditions of the form (S<=0+C); and
creating a directed edge from the 0 node to a node representing a first variable, S, with cost C, for conditions of the form (0<=X+C).

5. The method of claim 3, where finding the shortest path between all nodes in M includes
running the Floyd-Warshall Shortest Path Algorithm against M.

6. The method of claim 3, where determining if M has a negative cycle includes
determining if M includes a negative cost edge from a node to itself.

7. The method of claim 3, where analyzing the query further includes:
determining the transitive closure of the conditions and, if necessary, modifying the conditions.

8. The method of claim 7, where the query includes an outer query block and an inner query block, and where determining the transitive closure of the conditions and modifying the conditions includes:
determining the transitive closure of conditions in the outer query block and, if necessary, modifying the conditions in the outer query block and
determining the transitive closure of conditions in the inner query block and, if necessary, modifying the conditions in the inner query block.

9. The method of claim 7, where determining the transitive closure of the conditions includes:
creating and populating a global conditions set including conditions from the outer query block and the inner query block; and
determining the transitive closure of the global conditions set.

10. The method of claim 9, where the transitive closure includes one or more transitive closure conditions, and where modifying the conditions to achieve transitive includes:
for each transitive closure condition of the form (COL COMP C), where COL is a column, COMP is a comparison, and C is a constant:
if COL appears in the outer query block, adding the transitive closure condition to the outer query block; and
if COL appears in the inner query block, adding the transitive closure condition to the inner query block.

11. A computer-implemented method for analyzing a query, the query including one or more conditions of the form (X+Y OP C), where X and Y are variables, C is a constant, and OP is an operator, the method including:
determining the satisfiability of the query, including:
determining the satisfiability of the one or more conditions of the form (X+Y OP C).

12. The method of claim 11, where a negation of OP is represented by the operator OP', and where determining the satisfiability of the query includes:
assigning conditions of the form (X OP Y+C) to a set S1;
assigning condition of the form (X+Y OP C) to a set S2;
assigning conditions of the form (X OP C) to a set S3;
replacing each conditions in set S2 with two conditions in the form (Y OP −X+C) and (X OP −Y+C);
if −X is present in set S2:
for each condition in set S3:
adding a condition of the form (−X OP' −C) to set S3; and
determining the satisfiability of the group of conditions (S1 UNION S2 UNION S3).

13. The method of claim 12, where determining the satisfiability of the group of conditions includes:
converting the conditions to less-than-or-equal-to conditions;
creating a map M of the less-than-or-equal-to conditions;
finding the shortest path between all nodes in M; and
determining if M has a negative cycle and, if it does, returning that the conditions are not satisfiable.

14. The method of claim 13, where creating the map M of the conditions in the global conditions set includes:
creating a node for each of the variables in the conditions, including creating separate nodes for variables with opposite signs;
creating a node for 0;
creating a directed edge from a node representing a first variable, S, to a node representing a second variable, T, with a cost, C, for conditions of the form (S<=T+C);
creating a directed edge from a node representing a first variable, S, to the 0 node, with cost C, for conditions of the form (S<=0+C); and
creating a directed edge from the 0 node to a node representing a first variable, S, with cost C, for conditions of the form (0<=X+C).

15. The method of claim 11, where analyzing the query further includes:
determining the transitive closure of the conditions and, if necessary, modifying the conditions.

16. A computer program, stored on a tangible storage medium, for use in analyzing one or more database queries, each query including one, or more conditions and one or more sub-queries, the conditions including one or more connecting conditions that introduce the sub-query in the query, each of the sub-queries including zero or more conditions, the computer program including executable instructions that cause a computer to:
determine the satisfiability of the query, including executable instructions that cause the computer to:
determine the satisfiability of the connecting conditions;
determine the satisfiability of the conditions in the sub-queries; and
determine the satisfiability of all other conditions;
where the executable instructions for determining the satisfiability of the query cause the computer to:
create and populate a global conditions set; and
determine the satisfiability of the global conditions set; and
where the query includes a clause of the form (X CC (SELECT Y FROM T)), where CC is a connecting condition, X and Y are variables or columns, T is a set of one or more tables or views, and where the executable instructions for populating the global conditions cause the computer to:

if CC is "IN," add (X=Y) to the global conditions set;
if CC is "NOT IN," add (X< >Y) to the global conditions set; and
if CC includes arithmetic comparison COMP, add (X COMP Y) to the global conditions set.

17. A computer program, stored on a tangible storage medium, for use in analyzing one or more database queries, each query including one or more conditions and one or more sub-queries, the conditions including one or more connecting conditions that introduce the sub-query in the query, each of the sub-queries including zero or more conditions, the computer program including executable instructions that cause a computer to:

determine the satisfiability of the query, including executable instructions that cause the computer to:
determine the satisfiability of the connecting conditions;
determine the satisfiability of the conditions in the sub-queries; and
determine the satisfiability of all other conditions;
where the executable instructions for determining the satisfiability of the query cause the computer to:
create and populate a global conditions set; and
determine the satisfiability of the global conditions set; and
where the query includes a clause of the form (CC (SELECT Y FROM T WHERE R)), where CC is a connecting condition, Y is a variable or a column, T is a set of one or more tables or views, and R is a set of one or more conditions, and where the executable instructions for populating the global conditions set cause the computer to add R to the global conditions set.

18. A computer program, stored on a tangible storage medium, for use in analyzing one or more database queries, each query including one or more conditions and one or more sub-queries, the conditions including one or more connecting conditions that introduce the sub-query in the query, each of the sub-queries including zero or more conditions, the computer program including executable instructions that cause a computer to:

determine the satisfiability of the query, including executable instructions that cause the computer to:
determine the satisfiability of the connecting conditions;
determine the satisfiability of the conditions in the sub-queries; and
determine the satisfiability of all other conditions;
where the executable instructions for determining the satisfiability of the query cause the computer to:
create and populate a global conditions set; and
determine the satisfiability of the global conditions set; and
where the executable instructions for determining the satisfiability of the global conditions set cause the computer to:
convert the form of the conditions in the global conditions set to less-than-or-equal-to conditions;
create a map M of the less-than-or-equal-to conditions;
find the shortest path between all nodes in M; and
determine if M has a negative cycle and, if it does, return that the query is not satisfiable.

19. The computer program of claim 18, where the executable instructions for creating the map M of the conditions in the global conditions set cause the computer to:

create a node for each of the variables in the conditions;
create a node for 0;
create a directed edge from a node representing a first variable, S, to a node representing a second variable, T, with a cost, C, for conditions of the form (S<=T+C);
create a directed edge from a node representing a first variable, S, to the 0 node, with cost C, for conditions of the form (S<=0+C); and
create a directed edge from the 0 node to a node representing a first variable, S, with cost C, for conditions of the form (0<=X+C).

20. The computer program of claim 18, where the executable instructions for finding the shortest path between all nodes in M cause the computer to:
run the Floyd-Warshall Shortest Path Algorithm against M.

21. The computer program of claim 18, where the executable instructions for determining if M has a negative cycle cause the computer to:
determine if M includes a negative cost edge from a node to itself.

22. A computer program, stored on a tangible storage medium, for use in analyzing one or more database queries, each query including one or more conditions and one or more sub-queries, the conditions including one or more connecting conditions that introduce the sub-query in the query, each of the sub-queries including zero or more conditions, the computer program including executable instructions that cause a computer to:

determine the satisfiability of the query, including executable instructions that cause the computer to:
determine the satisfiability of the connecting conditions;
determine the satisfiability of the conditions in the sub-queries; and
determine the satisfiability of all other conditions;
where the executable instructions for determining the satisfiability of the query cause the computer to:
create and populate a global conditions set; and
determine the satisfiability of the global conditions set; and
where the transitive closure includes one or more transitive closure conditions, and where the executable instructions for modifying the conditions to achieve transitive cause the computer to:
for each transitive closure condition of the form (COL COMP C), where COL is a column, COMP is a comparison, and C is a constant:
if COL appears in the outer query block, add the transitive closure condition to the outer query block; and
if COL appears in the inner query block, add the transitive closure condition to the inner query block.

23. A computer program, stored on a tangible storage medium, for use in analyzing one or more database queries, each query including one or more conditions of the form (X+Y OP C), where X and Y are variables or columns, C is a constant, and OP is an operator, the executable instructions that cause a computer to:

determine the satisfiability of the query, including executable instruction that cause the computer to:
determine the satisfiability of the one or more conditions of the form (X+Y OP C).

24. The computer program of claim 23, where a negation of OP is represented by the operator OP', and where the executable instructions for determining the satisfiability of
the query cause the computer to:
   assign conditions of the form (X OP Y+C) to a set S1;
   assign condition of the form (X+Y OP C) to a set S2;
   assign conditions of the form (X OP C) to a set S3;
   replace each conditions in set S2 with two conditions in
      the form (Y OP −X+C) and (X OP −Y+C);
   if −X is present in set S2:
      for each condition in set S3:
         add a condition of the form (−X OP' −C) to set S3;
         and
   determine the satisfiability of the group of conditions (S1
      UNION S2 UNION S3).
25. The computer program of claim 24, where the executable instructions for determining the satisfiability of the group of conditions cause the computer to:
   convert the conditions to less-than-or-equal-to conditions;
   create a map M of the less-than-or-equal-to conditions;
   find the shortest path between all nodes in M; and
   determine if M has a negative cycle and, if it does, return
      that the conditions are not satisfiable.
26. The computer program of claim 25, where the executable instruction for creating the map M of the conditions in the global conditions set cause the computer to:
   create a node for each of the variables in the conditions,
      including creating separate nodes for variables with
      opposite signs;
   create a node for 0;
   create a directed edge from a node representing a first
      variable, S, to a node representing a second variable, T,
      with a cost, C, for conditions of the form (S<=T+C);
   create a directed edge from a node representing a first
      variable, S, to the 0 node, with cost C, for conditions of
      the form (S<=0+C); and
   create a directed edge from the 0 node to a node representing a first variable, S, with cost C, for conditions of
      the form (0<=X+C).
27. The computer program of claim 23, where the executable instruction for analyzing the query further cause the computer to:
   determine the transitive closure of the conditions and, if
      necessary, modifying the conditions.
28. A database system including:
a massively parallel processing system including:
one or more nodes;
a plurality of CPUs, each of the one or more nodes
   providing access to one or more CPUs;
a plurality of data storage facilities each of the one or
   more CPUs providing access to one or more data
   storage facilities;
a process for execution on the massively parallel processing system for analyzing one or more database queries,
   each query including one or more conditions and one or
   more sub-queries, the conditions including one or more
   connecting conditions that introduce the sub-query in
   the query, each of the sub-queries including zero or
   more conditions the process including:
   determining the satisfiability of the query, including:
      determining the satisfiability of the connecting conditions;
      determining the satisfiability of the conditions in the
         sub-queries; and
      determining the satisfiability of all other conditions;
   where determining the satisfiability of the conditions
      includes:
      creating and populating a global conditions set; and
      determining the satisfiability of the global conditions
         set; and
where the query includes a clause of the form (X CC
   (SELECT Y FROM T)), where CC is a connecting
   condition, X and Y are variables or columns T is a set
   of one or more tables or views, and where populating
   the global conditions set includes:
   if CC is "IN," adding (X=Y) to the global conditions
      set;
   if CC is "NOT IN," adding (X< >Y) to the global
      conditions set; and
   if CC includes arithmetic comparison COMP, adding
      (X COMP Y) to the global conditions set.
29. A database system including:
a massively parallel processing system including:
one or more nodes;
a plurality of CPUs, each of the one or more nodes
   providing access to one or more CPUs;
a plurality of data storage facilities each of the one or
   more CPUs providing access to one or more data
   storage facilities;
a process for execution on the massively parallel processing system for analyzing one or more database queries,
   each query including one or more conditions and one or
   more sub-queries, the conditions including one or more
   connecting conditions that introduce the sub-query in
   the query, each of the sub-queries including zero or
   more conditions, the process including:
   determining the satisfiability of the query, including:
      determining the satisfiability of the connecting conditions;
      determining the satisfiability of the conditions in the
         sub-queries; and
      determining the satisfiability of all other conditions;
   where determining the satisfiability of the conditions
      includes:
      creating and populating a global conditions set; and
      determining the satisfiability of the global conditions
         set; and
where the query includes a clause of the form (CC
   (SELECT Y FROM T WHERE R)), where CC is a
   connecting condition, Y is a variable or a column, T is
   a set of one or more tables or views, and R is a set of
   one or more conditions, and where populating the
   global conditions set includes adding R to the global
   conditions set.
30. A database system including:
a massively parallel processing system including:
one or more nodes;
a plurality of CPUs, each of the one or more nodes
   providing access to one or more CPUs;
a plurality of data storage facilities each of the one or
   more CPUs providing access to one or more data
   storage facilities;
a process for execution on the massively parallel processing system for analyzing one or more database queries,
   each query including one or more conditions and one or
   more sub-queries, the conditions including one or more
   connecting conditions that introduce the sub-query in
   the query, each of the sub-queries including zero or
   more conditions, the process including:
   determining the satisfiability of the query, including:
      determining the satisfiability of the connecting conditions;
      determining the satisfiability of the conditions in the
         sub-queries; and
      determining the satisfiability of all other conditions;
   where determining the satisfiability of the conditions
      includes:
      creating and populating a global conditions set; and determining the satisfiability of the global conditions set; and
where determining the satisfiability of the global conditions set includes:
converting the form of the conditions in the global conditions set to less-than-or-equal-to conditions;
creating a map M of the less-than-or-equal-to conditions;
finding the shortest path between all nodes in M; and
determining if M has a negative cycle and, if it does, returning that the query is not satisfiable.

31. The database system of claim 30, where creating the map M of the conditions in the global conditions set includes:
creating a node for each of the variables in the conditions;
creating a node for 0;
creating a directed edge from a node representing a first variable, S, to a node representing a second variable, T, with a cost, C, for conditions of the form (S<=T+C);
creating a directed edge from a node representing a first variable, S, to the 0 node, with cost C, for conditions of the form (S<=0+C); and
creating a directed edge from the 0 node to a node representing a first variable, S, with cost C, for conditions of the form (0<=X+C).

32. The database system of claim 30, where finding the shortest path between all nodes in M includes
running the Floyd-Warshall Shortest Path Algorithm against M.

33. The database system of claim 30, where determining if M has a negative cycle includes
determining if M includes a negative cost edge from a node to itself.

34. A database system including:
a massively parallel processing system including:
one or more nodes;
a plurality of CPUs, each of the one or more nodes providing access to one or more CPUs;
a plurality of data storage facilities each of the one or more CPUs providing access to one or more data storage facilities;
a process for execution on the massively parallel processing system for analyzing one or more database queries, each query including one or more conditions and one or more sub-queries, the conditions including one or more connecting conditions that introduce the sub-query in the query, each of the sub-queries including zero or more conditions, the process including:
determining the satisfiability of the query, including:
determining the satisfiability of the connecting conditions; and
determining the satisfiability of the conditions in the sub-queries; and
determining the transitive closure of the conditions and, if necessary, modifying the conditions; where determining the transitive closure of the conditions includes:
creating and populating a global conditions set including conditions from the outer query block and the inner query block; and
determining the transitive closure of the global conditions set; and
where the transitive closure includes one or more transitive closure conditions, and where modifying the conditions to achieve transitive includes:
for each transitive closure condition of the form (COL COMP C), where COL is a column, COMP is a comparison, and C is a constant:
if COL appears in the outer query block, adding the transitive closure condition to the outer query block; and
if COL appears in the inner query block, adding the transitive closure condition to the inner query block.

35. A database system including:
a massively parallel processing system including:
one or more nodes;
a plurality of CPUs, each of the one or more nodes providing access to one or more CPUs;
a plurality of data storage facilities each of the one or more CPUs providing access to one or more data storage facilities;
a process for execution on the massively parallel processing system for analyzing one or more database queries, each query including one or more conditions of the form (X+Y OP C), where X and Y are variables, C is a constant, and OP is an operator, the process including:
determining the satisfiability of the query, including:
determining the satisfiability of the one or more conditions of the form (X+Y OP C).

36. The database system of claim 35, where a negation of OP is represented by the operator OP', and where determining the satisfiability of the query includes:
assigning conditions of the form (X OP Y+C) to a set S1;
assigning condition of the form (X+Y OP C) to a set S2;
assigning conditions of the form (X OP C) to a set S3;
replacing each conditions in set S2 with two conditions in the form (Y OP −X+C) and (X OP −Y+C);
if −X is present in set S2:
for each condition in set S3:
adding a condition of the form (−X OP' −C) to set S3; and
determining the satisfiability of the group of conditions (S1 UNION S2 UNION S3).

37. The database system of claim 36, where determining the satisfiability of the group of conditions includes:
converting the conditions to less-than-or-equal-to conditions;
creating a map M of the less-than-or-equal-to conditions;
finding the shortest path between all nodes in M; and
determining if M has a negative cycle and, if it does, returning that the conditions are not satisfiable.

38. The database system of claim 37, where creating the map M of the conditions in the global conditions set includes:
creating a node for each of the variables in the conditions, including creating separate nodes for variables with opposite signs;
creating a node for 0;
creating a directed edge from a node representing a first variable, S, to a node representing a second variable, T, with a cost, C, for conditions of the form (S<=T+C);
creating a directed edge from a node representing a first variable, S, to the 0 node, with cost C, for conditions of the form (S<=0+C); and
creating a directed edge from the 0 node to a node representing a first variable, S, with cost C, for conditions of the form (0<=X+C).

39. The database system of claim 35, where the process further includes:
determining the transitive closure of the conditions and, if necessary, modifying the conditions.

* * * * *